United States Patent
Bolzacchini (10) Patent No.: US 9,848,610 B2
(45) Date of Patent: Dec. 26, 2017

(54) METHOD FOR STUFFING FOOD PRODUCTS IN CASINGS AND STUFFING MACHINE FOR ITS EXECUTION

(71) Applicant: INOX MECCANICA—S.R.L., Goito, Frazione Solarolo (IT)

(72) Inventor: Giovanni Bolzacchini, Frazione Solarolo (IT)

(73) Assignee: INOX MECCANICA—S.R.L., Goito, Frazione Solarolo (IT)

( * ) Notice: Subject to any disclaimer, the term of this patent is extended or adjusted under 35 U.S.C. 154(b) by 125 days.

(21) Appl. No.: 14/569,390

(22) Filed: Dec. 12, 2014

(65) Prior Publication Data
US 2015/0164094 A1   Jun. 18, 2015

(30) Foreign Application Priority Data

Dec. 13, 2013 (IT) .............................. VR2013A0281

(51) Int. Cl.
| | |
|---|---|
| A22C 11/00 | (2006.01) |
| A22C 11/02 | (2006.01) |
| A22C 11/12 | (2006.01) |
| A22C 13/00 | (2006.01) |

(52) U.S. Cl.
CPC ............ *A22C 11/02* (2013.01); *A22C 11/125* (2013.01); *A22C 2013/0053* (2013.01)

(58) Field of Classification Search
CPC .......... A22C 11/00; A22C 11/02; A22C 11/10
USPC ................ 452/21–26, 30–35, 46–48, 51
See application file for complete search history.

(56) References Cited

U.S. PATENT DOCUMENTS

| | | | | |
|---|---|---|---|---|
| 4,403,773 A | * | 9/1983 | Swann ............... | A63B 21/4007 482/130 |
| 4,470,171 A | * | 9/1984 | Rusmussen ............ | A22C 11/02 138/118.1 |
| 4,505,003 A | * | 3/1985 | Becker ............... | A22C 11/0245 138/118.1 |
| 4,642,849 A | * | 2/1987 | Piereder ............. | A22C 11/0263 452/31 |
| 4,734,956 A | * | 4/1988 | Frey ................... | A22C 13/0003 138/118.1 |
| 4,915,968 A | * | 4/1990 | Matthews ............ | A22C 7/0007 264/211.11 |
| 5,045,020 A | * | 9/1991 | Neeff ................... | A22C 13/023 138/118.1 |
| 5,203,735 A | | 4/1993 | Stanek | |
| 5,281,471 A | | 1/1994 | Diete et al. | |
| 5,378,193 A | | 1/1995 | Stanley | |
| 5,405,664 A | * | 4/1995 | Sirinyan ............ | A22C 13/0013 138/118.1 |
| 5,549,943 A | * | 8/1996 | Vicik ................. | A22C 13/0013 138/118.1 |

(Continued)

OTHER PUBLICATIONS

Search Report for IT VR20130281 dated Jun. 13, 2014.

*Primary Examiner* — Richard Price, Jr.
(74) *Attorney, Agent, or Firm* — Koppel, Patrick, Heybl & Philpott (57) ABSTRACT

A method for stuffing food products in casings comprising the steps that consist in inserting the product to be stuffed in a first casing, which is permeable to air, and in a second casing, which is impermeable to air and is arranged outside the first casing, creating an at least partial vacuum at least between the first casing and the second casing.

11 Claims, 9 Drawing Sheets

(56) References Cited

U.S. PATENT DOCUMENTS

| | | | | |
|---|---|---|---|---|
| 5,887,145 | A * | 3/1999 | Harari | G06F 13/4068 710/13 |
| 6,200,613 | B1 * | 3/2001 | Schafer | A22C 13/0013 426/105 |
| 6,821,588 | B1 * | 11/2004 | Hammer | A22C 13/0013 138/118.1 |
| 7,011,858 | B2 * | 3/2006 | Grolig | A22C 13/00 206/802 |
| 7,195,551 | B2 * | 3/2007 | Shefet | A22C 11/001 426/513 |
| 7,476,147 | B2 * | 1/2009 | Rossi | A22C 11/0227 452/32 |
| 8,226,457 | B2 * | 7/2012 | Hihnala | A22C 13/0013 452/21 |
| 8,628,386 | B2 * | 1/2014 | Schafer | A22C 13/0003 452/32 |
| 2005/0126403 | A1 | 6/2005 | Arias Lopez | |
| 2012/0295005 | A1 * | 11/2012 | Kleckner | A23L 1/31445 426/574 |

* cited by examiner

METHOD FOR STUFFING FOOD PRODUCTS IN CASINGS AND STUFFING MACHINE FOR ITS EXECUTION

The present invention relates to a method for stuffing food products in casings and a stuffing machine for its execution.

Currently stuffing machines are known for obtaining food products constituted by pieces of meat stuffed into a casing that is impermeable to air, which is closed at the ends by way of adapted fasteners, which are constituted by ties or clips.

Such machines have, usually, a basic structure that supports a mold for the formation of the product and is connected with an encasing tube, over the outer surface of which a casing is fitted and is closed, at its end facing the output end of the encasing tube, by way of a clipping head.

A pusher acts inside the mold and is actuated by a pneumatic cylinder the function of which is to press the food product, after its formation, through the encasing tube until it is brought into contact with the clipped end of the casing, so as to insert the product into a portion of the casing, which is progressively unfolded from the encasing tube and is subsequently cut off, at the end of the insertion of the product, and, then, closed, also at its other end, by the clipping head.

A drawback of these machines consists in the possibility that air remains inside the casing once the stuffed product has been obtained, with consequent problems not only relating to conservation but also relating to the end quality of the product.

For this reason machines have been offered in which a vacuum is created inside the mold.

However, it has been found that even these machines are not capable of satisfactorily eliminating the problem of air remaining in the stuffed product.

The aim of the present invention is to provide a valid solution to the drawbacks of the known art by providing a method for stuffing food products in casings which makes it possible to ensure the practically complete elimination of air inside the stuffed product.

Another object of the present invention is to provide a method for stuffing food products in casings which can be carried out with a small number of simple operations.

Another object of the present invention is to make available a stuffing machine that makes it possible to obtain stuffed products that have practically no air inside them, so as to ensure a long conservation and an optimal end quality thereof.

Another object of the present invention is to provide a stuffing machine that is structurally simple and is reliable and safe in operation.

Another object of the present invention is to provide a stuffing machine that is competitive from a merely economic viewpoint as well.

This aim and these and other objects which will become better apparent hereinafter are achieved by a stuffing method and by a stuffing machine, according to the invention, as defined in the appended claims.

Further characteristics and advantages of the invention will become better apparent from the description of some preferred, but not exclusive, embodiments of the stuffing method and machine according to the invention, which are illustrated by way of non-limiting example in the accompanying drawings wherein.

As will be better explained below, the method according to the invention consists in inserting the product to be stuffed into a first casing, which is permeable to air, and into a second casing, which is impermeable to air and is arranged outside the first casing, thus creating an at least partial vacuum at least between the first and the second casing.

Conveniently, it is possible, optionally, to create the at least partial vacuum inside the first casing as well, during the insertion of the food product into the first and into the second casing.

Advantageously, the method according to the invention can also include, before the step of insertion of the product into the first casing and into the second casing, a step that consists of closing a homologous end of the first and of the second casing, toward which the product is inserted, and, after the aforementioned insertion step, a step that consists of closing the other end of the first casing and of the second casing.

With reference to the figures, the machine for stuffing food products in casings, according to the invention, which is generally designated with the reference numeral 1, comprises a frame 2, which supports a stuffing duct 3 and a pusher 4, the function of which is to convey the food product to be stuffed, which is constituted, for example, by pieces of meat, toward the output end 3a of the stuffing duct 3.

The peculiarity of the invention consists in that it comprises a first supporting tube 5 for a first casing 5a, which is arranged outside the stuffing duct 3 and is permeable to air, and a second supporting tube 6 for a second casing 6a, which is arranged outside the first casing 5 and is impermeable to air.

Again according to the invention, means are provided of generating an at least partial vacuum at least between the first casing 5a and the second casing 6a.

Delving deeper into the details, a mold 8 is, conveniently, fitted as usual on the frame 2, and is provided with a corresponding closing cover, which is designed to form the product before it is sent to the stuffing duct 3.

The pusher 4 can move inside the mold 8, and is actuated by a pneumatic cylinder 4a, in order to press the product, after being formed in the mold 8, through the stuffing duct 3, which is, in turn, connected with the mold 8, by way of its input end 3b.

Advantageously, the first supporting tube 5 and the second supporting tube 6 are extended substantially coaxially to each other and substantially coaxially to the stuffing duct 3.

More specifically, the first supporting tube 5 and the second supporting tube 6 extend, for example, from a common wall 2a, which is defined on the frame 2 and is contiguous with the mold 8, along a substantially horizontal direction.

The first casing 5a is fitted over the first supporting tube 5, and is accumulated, with one of its portions, against an abutment protrusion 7a, which is arranged in a region of the first supporting tube 5 proximate to the wall 2a, so as to create a reserve of the first casing 5a, which is made progressively available at the exit of the first supporting tube 5 as the machine processes the products to be treated. For example, the first casing 5*a* is constituted by a microperforated tubular element made of an adapted material.

Similarly, the second casing 6*a* is fitted over the second supporting tube 6, and is, conveniently, accumulated proximate to a plate 7*b*, which is connected to the second supporting tube 6 substantially at its end directed toward the wall 2*a*. The second casing 6*a* can be provided by a tubular element made of adapted material.

Preferably, as shown in the figures, the stuffing duct 3 is defined by an additional tube 9, which extends internally with respect to the first supporting tube 5, and also extending, conveniently, from the wall 2*a* of the frame 2.

In this case, advantageously, the additional tube 9 extends for a greater length with respect to the first supporting tube 5, protruding from the end of the latter which is directed opposite to the wall 2*a*.

Conveniently, the first supporting tube 5 can extend, in turn, for a greater length with respect to the second supporting tube 6, protruding from the end of the second supporting tube 6 which is directed opposite to the wall 2*a*.

According to a possible variation of embodiment, not shown, it is also possible for the stuffing duct 3 to be provided by the internal portion of the first supporting tube 5.

Conveniently, the above mentioned vacuum generation means comprise air extraction means, which are constituted, for example, by a vacuum pump, not shown, or other similar device, and are connected to an intake 10, which is connected with the inside of the second supporting tube 6, in order to allow the extraction of the air from the space 11 comprised between the first supporting tube 5 and the second supporting tube 6.

Preferably, the intake 10 is provided by way of a connecting nipple 10*a*, which is arranged, for example, in a region comprised between the wall 2*a* and the ends of the first supporting tube 5 and of the second supporting tube 6 that are directed toward the wall 2*a*.

Advantageously, the vacuum generation means can also comprise at least one passage port 12 that is adapted to connect the inside of the second supporting tube 6 and, in particular, the space 11, with the inside of the first supporting tube 5, in order to allow the extraction of the air, by the aforementioned extraction means, also from the interspace 13 comprised between the first supporting tube 5 and the additional tube 9 that defines the stuffing duct 3.

Figure 3:
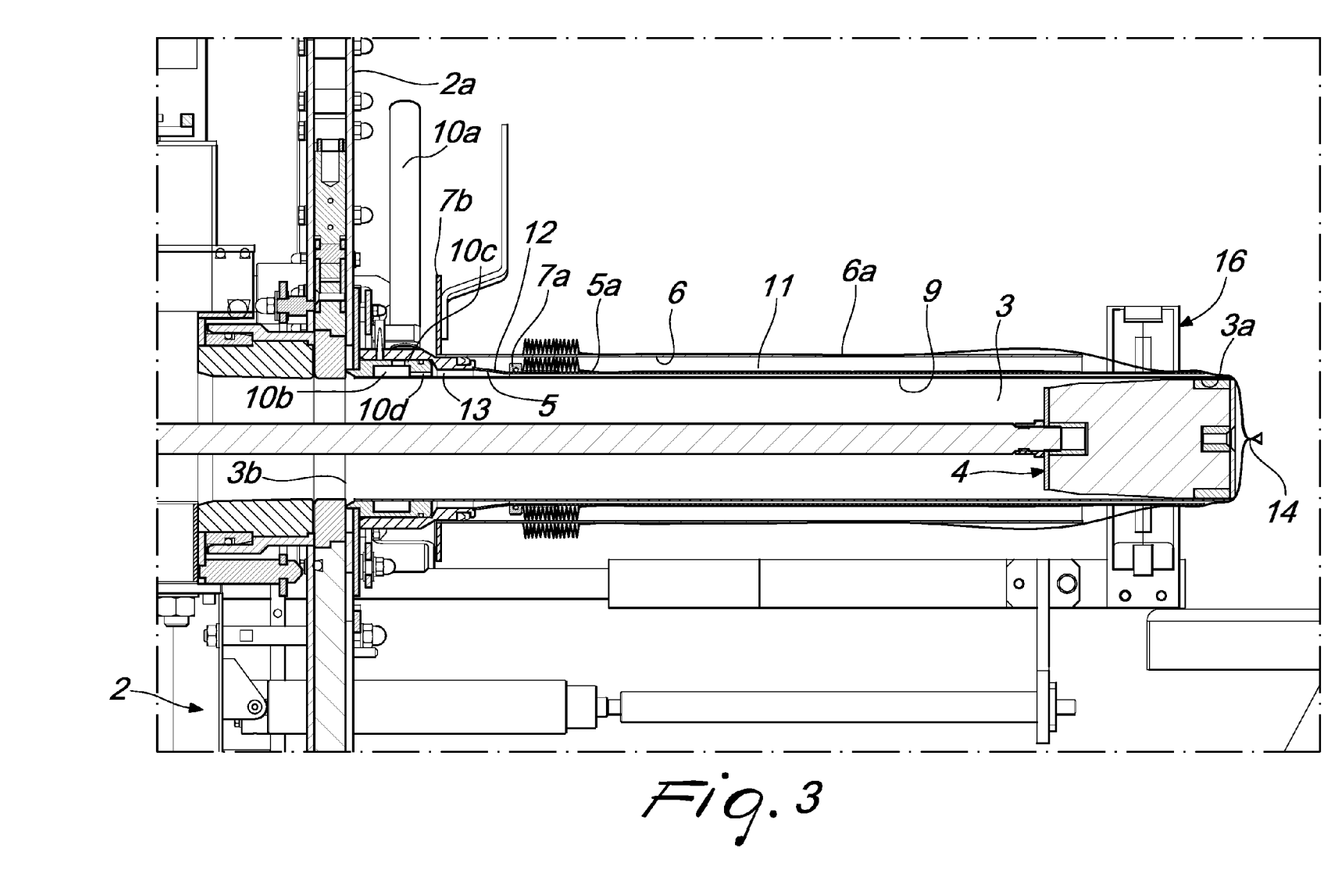
FIG. 3 is a longitudinal sectional view of a detail of the machine in the condition immediately preceding the reentry of the pusher into the mold of the machine.
Figure 4:
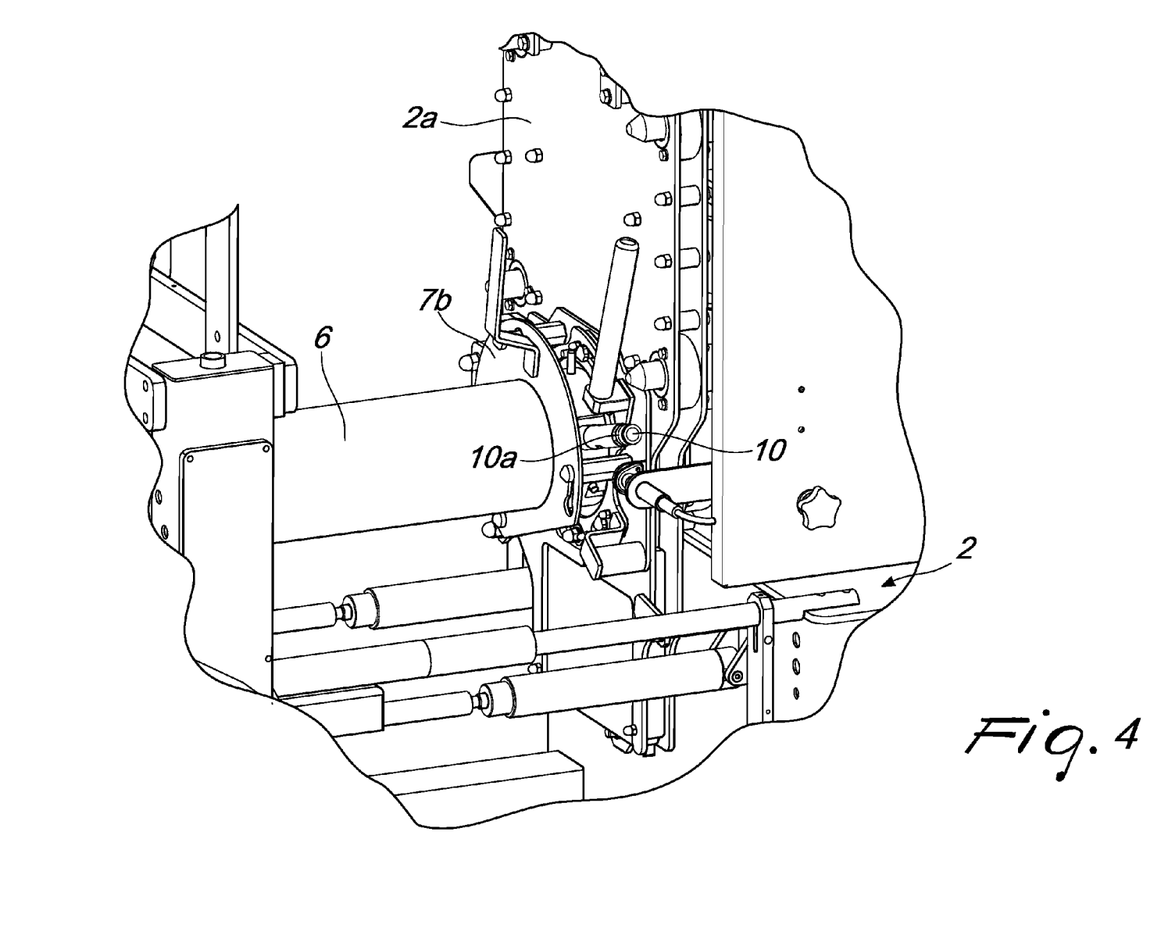
FIG. 4 is a perspective view of a detail of the machine according to the invention.

Preferably, according to the embodiment shown in FIG. 3, the connecting nipple 10*a* is connected to an inner vacuum chamber 10*b* defined in a ring 10*c* fitted over the additional tube 9 and provided with holes 10*d* that are adapted to connect the inner vacuum chamber 10*b* with the interspace 13.

Conveniently, it is possible, optionally, for the vacuum generation means to comprise means for extracting the air that is present inside the stuffing duct 3. Such suction means, not shown, can, for example, be provided by way of an adapted intake pump that is connected to the mold 8, so as to suck the air from the mold 8 and, thus, also from the stuffing duct 3.

As can be seen, in particular, in FIG. 3, while waiting to receive the food product, pushed by the pusher 4 into the stuffing duct 3, inside them, the first casing 5*a* and the second casing 6*a*, which are both closed at a homologous end thereof arranged in front of the output end 3*a* of the stuffing duct 3, in the direction of motion of the product to be treated, by a single fastener or clip, which is constituted, for example, by a cord 14, which is applied by means for closing the first casing 5*a* and the second casing 6*a*, which are positioned, during the operation of the machine, in a region substantially facing the output end 3*a* of the stuffing duct 3.

Such closure means can be provided by a clipping head 15, conventional, which comprises a mobile clamp that is adapted to apply two clips to the first casing 5*a* and to the second casing 6*a* and to carry out the cutting of the first casing 5*a* and of the second casing 6*a* in the portion comprised between the two clips.

Advantageously, the machine according to the invention is, furthermore, provided with retention means 16, which are adapted to contrast the sliding motion of the second casing 6*a* and of the first casing 5*a*, with respect to the first supporting tube 5, and are, conveniently, provided by a pair of mutually opposite sliding blocks or jaws 16*a*, 16*b*, which are actuated by respective actuating cylinders 17*a*, 17*b*.

In particular, as can be seen in FIG. 3, the retention means 16 are, conveniently, adapted to act at the region in which the first supporting tube 5 protrudes from the second supporting tube 6, so as to be able to contrast the sliding movement of the second casing 6*a* in contact with the first casing 5*a* and of the latter in contact with the first supporting tube 5.

Downstream of the clipping head 15, with respect to the direction of motion of the processed product, a resting surface 18 is provided, which is constituted, for example, by a moving mat that is adapted to transport the processed product on a sliding surface with rollers 19, by way of which the processed product is removed from the machine.

It should be noted that the frame 2 that supports the mold 8 and the stuffing duct 3, and also the first supporting tube 5, the second supporting tube 6 and the retention means 16, is connected to a sled 20, which is movable so that it can slide, with respect to a base 21 of the machine, on linear guides 21*a*, which extend along a direction that is substantially parallel to the direction of extension of the stuffing duct 3.

In particular, the sled 20 can be actuated in motion, along the linear guides 21*a*, by way of movement means that comprise at least one actuation cylinder 22 that acts between an abutment wall 22*a*, which is integral with the base 21, and a portion of the sled 20, so that the sled 20 can be moved toward or away from the resting surface 18, passing, substantially, from a position nearer to the resting surface 18 to at least one position farther from the resting surface 18, and vice versa.

Conveniently, the clipping head 15 is, in turn, mounted on a support that can slide in a direction that is substantially transverse with respect to the direction of extension of the stuffing duct 3, so that it can be moved, by corresponding actuation means, between a withdrawn position for rest, in which it is laterally distanced from the axis of the stuffing duct 3, and an advanced position for work, in which it is laterally closer to the axis of the stuffing duct 3.

Operation of the machine according to the invention is the following.

Initially, the mold 8 is open and is ready to receive the food product to be treated, while the first casing 5*a* and the second casing 6*a* are arranged so that their end portion opposite the mold 8 is protruding with respect to the output end 3*a* of the stuffing duct 3 and is closed by way of a clip.

In such situation, the sled 20 is in the nearer position to the resting surface 18 and the clipping head 15 is in the withdrawn position for rest.

Figure 5:
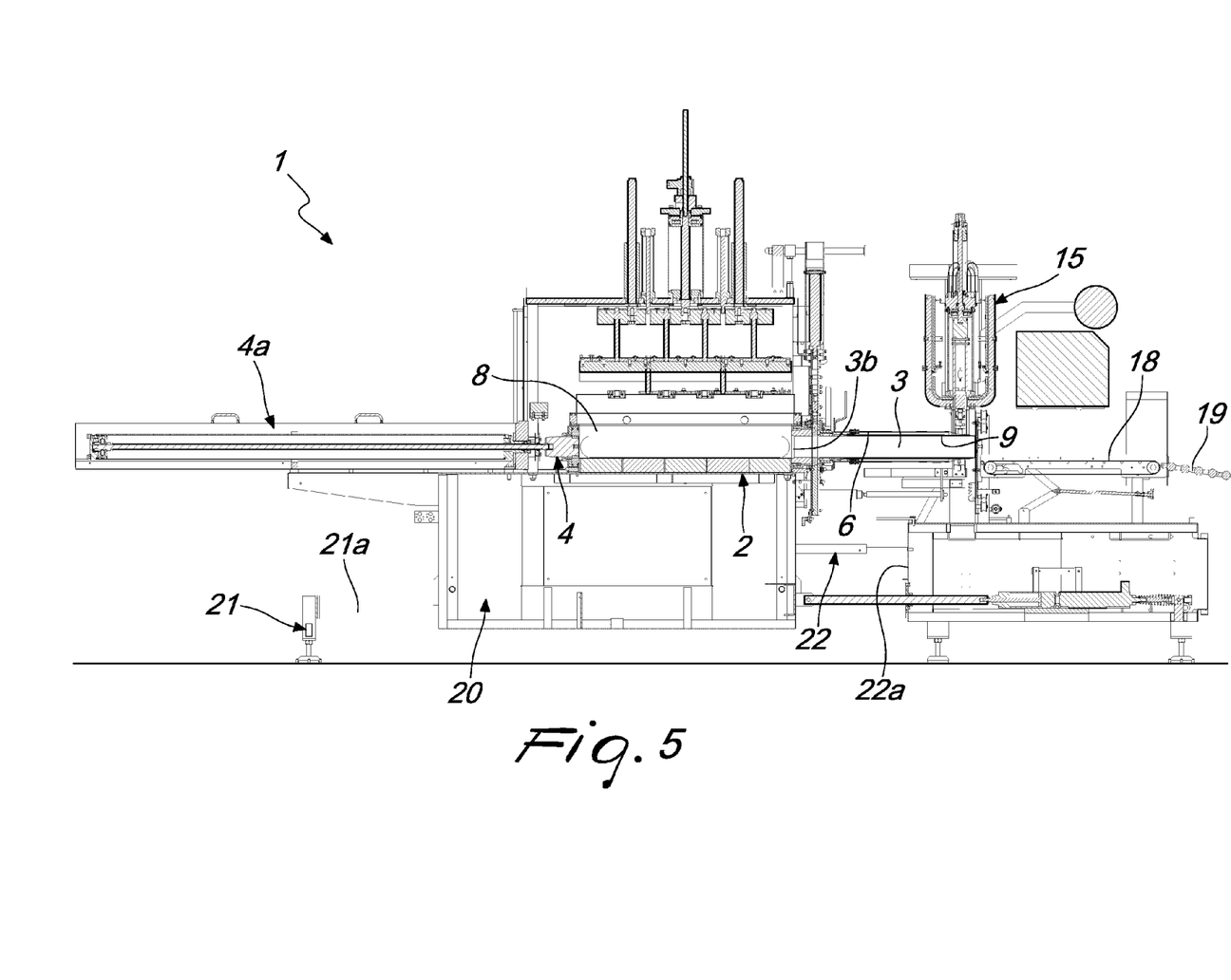
FIGS. 5 to 9 are longitudinal sectional views of a sequence of steps of operation of the machine according to the invention.

Beginning from the situation shown in FIG. 5, following the insertion of a piece of meat into the mold 8, the operator then closes the mold, by way of the corresponding cover, and proceeds to start the automatic processing sequence.

As a consequence, the means are activated for extracting the air from the mold 8 and, thus, also from the stuffing duct 3, so as to cause the formation of the piece of meat inserted into the mold 8.

The extraction means are also activated, and create the at least partial vacuum in the space 11, comprised between the first supporting tube 5 and the second supporting tube 6, and in the interspace 13, comprised between the first supporting tube 5 and the additional tube 9 that defines the stuffing duct 3.

Figure 6:
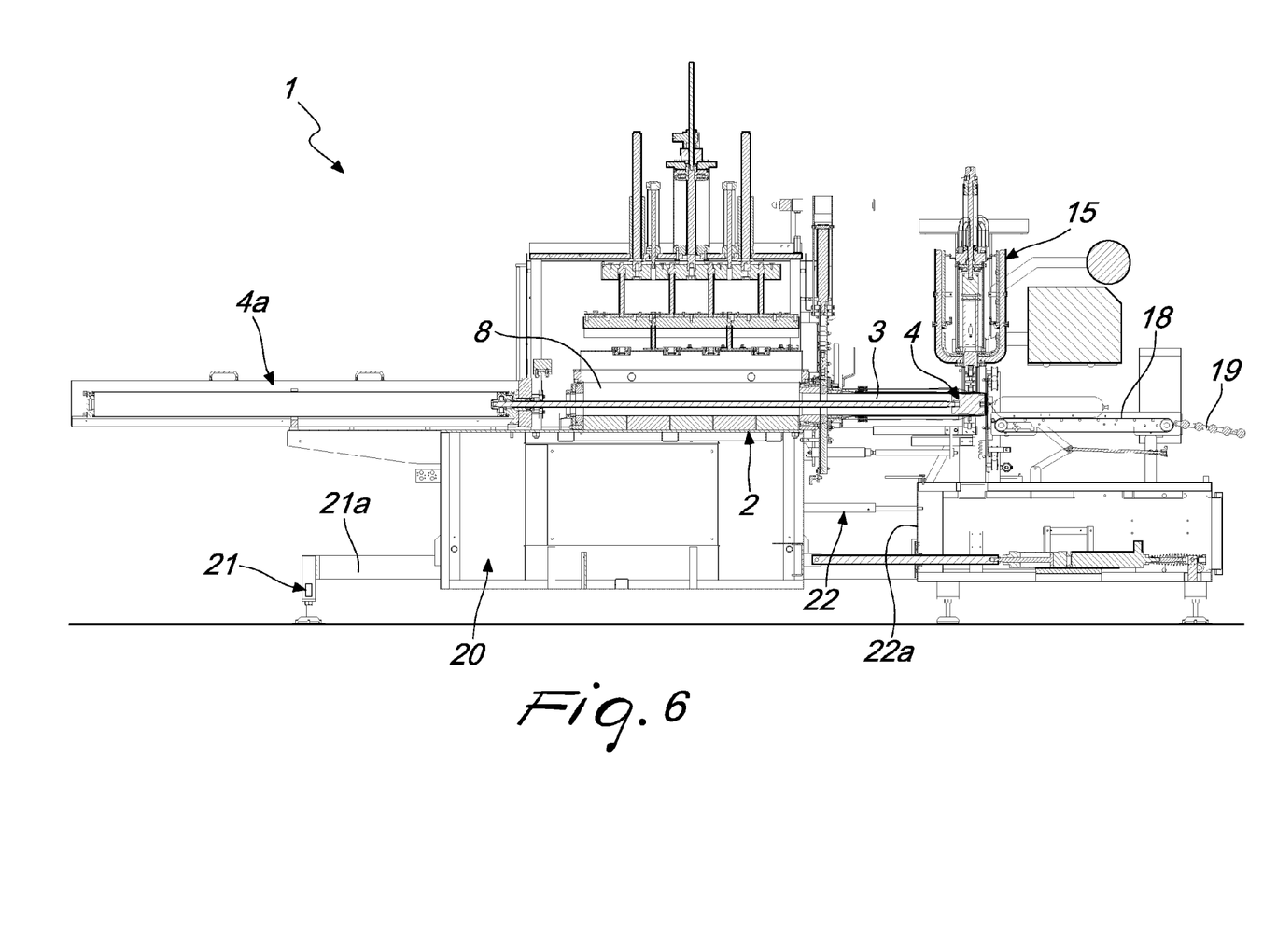

At this point the pusher 4 is activated, and pushes the formed piece inside the stuffing duct 3, until it is brought into contact with the closed end of the first casing 5*a* and of the second casing 6*a*, so as to deposit it subsequently on the resting surface 18, in the position shown in FIG. 6, with deploying of the first casing 5*a* from the first supporting tube 5 and of the second casing 6*a* from the second supporting tube 6.

During the insertion of the piece into the first casing 5*a* and into the second casing 6*a*, the jaws 16*a*, 16*b* are pushed by the respective actuating cylinders 17*a*, 17*b* against the second casing 6*a*, so as to determine the braking of the second casing 6*a* and of the first casing 5*a*.

In this situation, the at least partial vacuum created between the first casing 5*a* and the second casing 6*a* by the extraction means makes it possible to ensure an effective removal of the air from the piece being processed. Substantially, the air that is still contained in the piece is expelled through the first casing 5*a*, thanks to the at least partial vacuum created in the space 11 between the first supporting tube 5 and the second supporting tube 6, and subsequently evacuated permanently outside the second casing 6*a*, through the intake 10. In this manner, the almost complete elimination of the air inside the processed product can be obtained.

Figure 7:
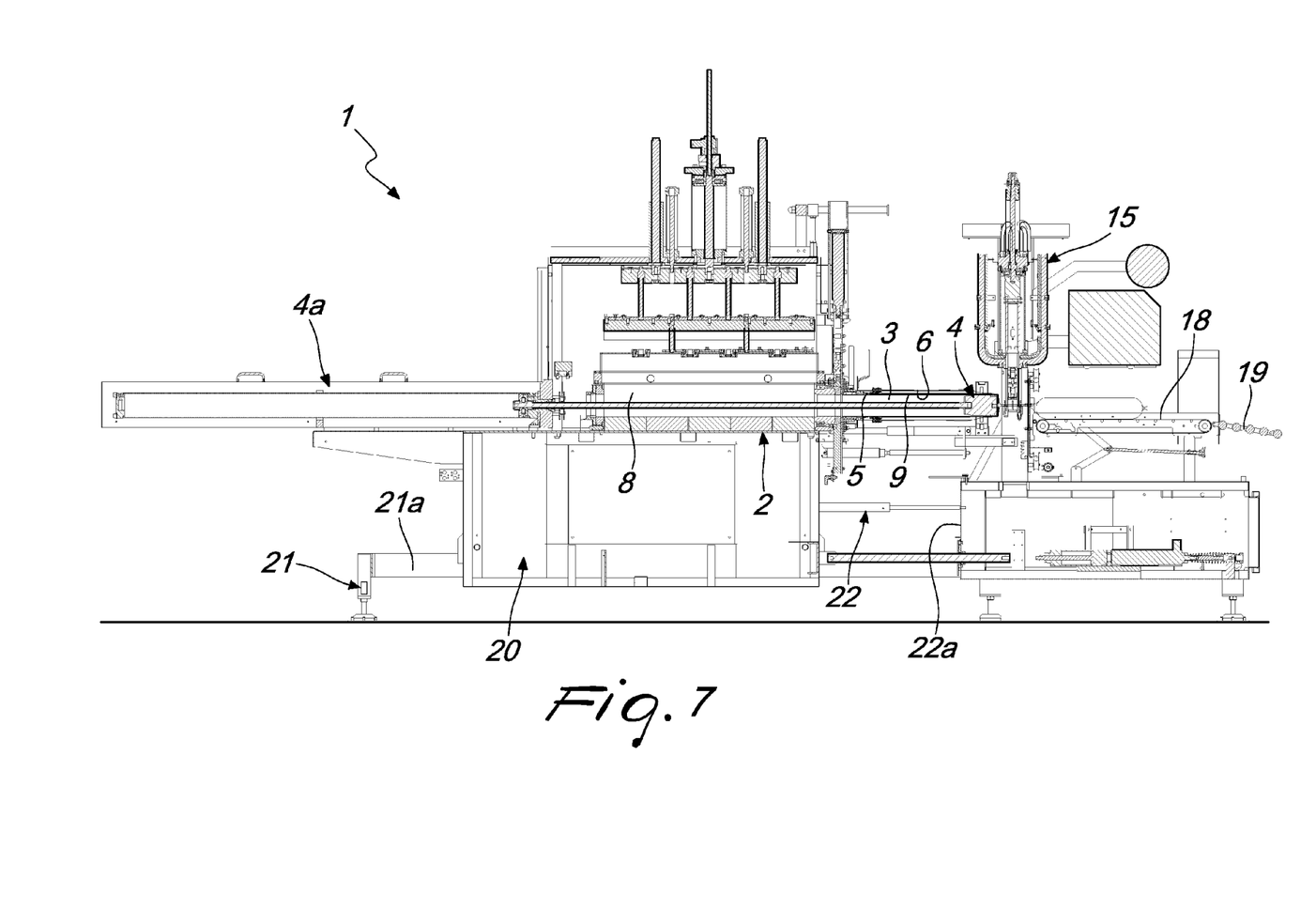

Once the product is placed on the resting surface 18, the sled 20 is brought by its movement means to the farther position from the resting surface 18, so that the clipping head 15 can be made to advance, until it is brought to the advanced position for work, as shown in FIG. 7.

Figure 8:
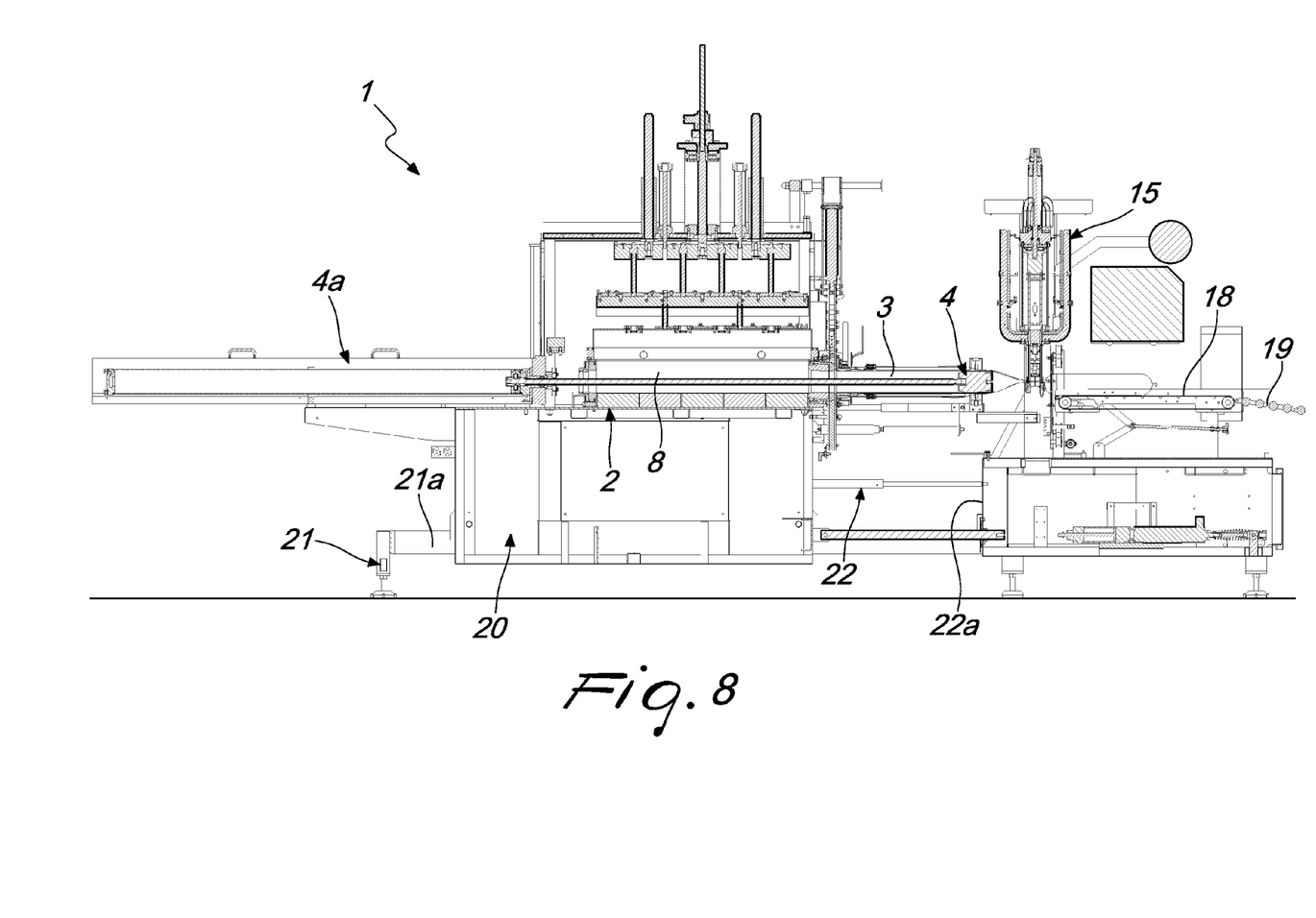

At this point, the clamp of the clipping head 15 is activated and, after the jaws 16*a* and 16*b* have been further tightened, by the corresponding actuating cylinders 17*a* and 17*b*, against the second casing 6*a*, so as to determine the immobilization thereof with respect to the first supporting tube 5 and to the second supporting tube 6, the sled 20 is moved further away by its means for moving with respect to the resting surface 18, so as to determine the pulling of the first casing 5*a* and of the second casing 6*a*, as shown in FIG. 8.

Figure 9:
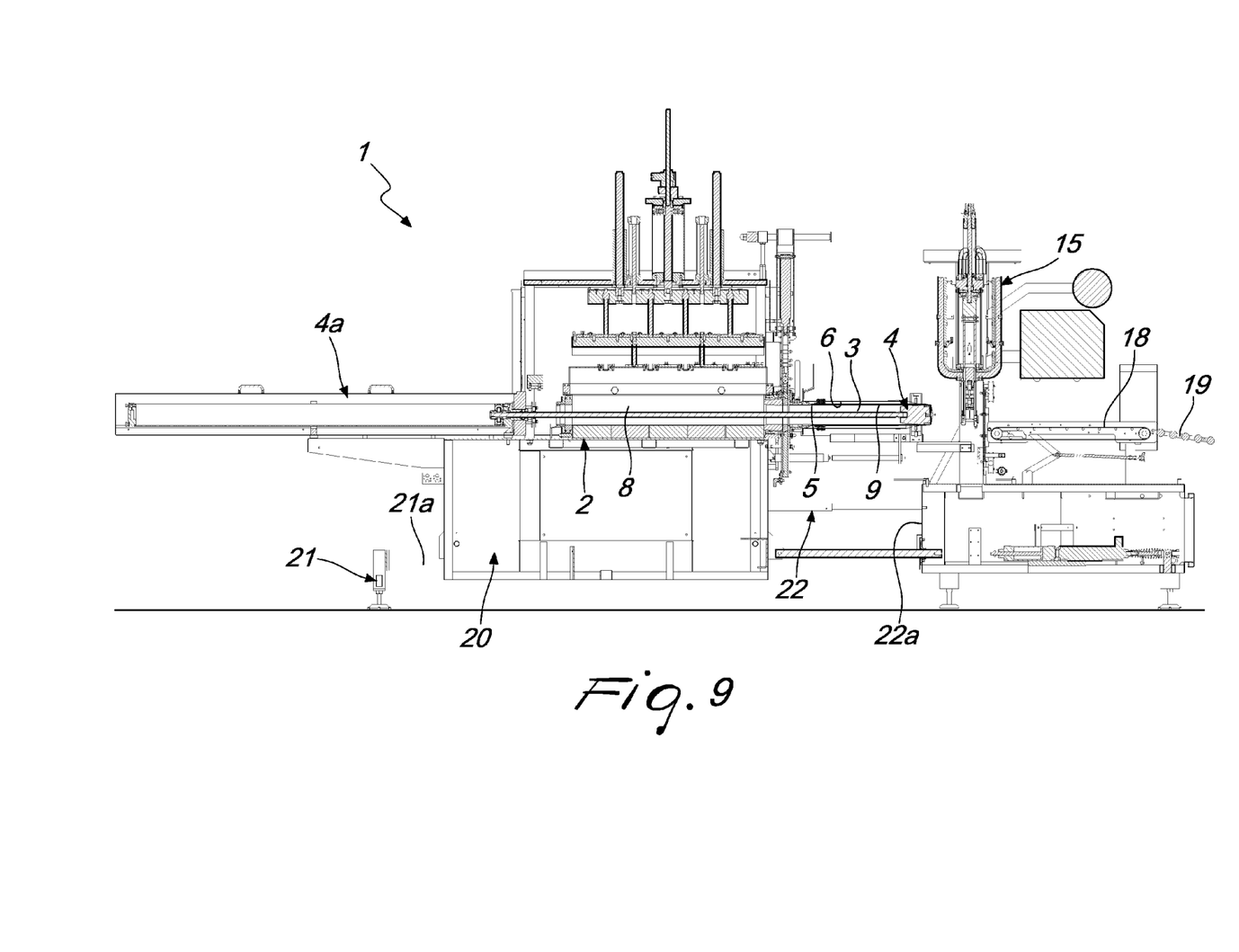

The clipping head 15 then applies two clips on the first casing 5*a* and on the second casing 6*a*, and executes a cut between them, so as to complete the processing of the product, which can then be removed from the machine via the sliding surface with rollers 19, and set up the first casing 5*a* and the second casing 6*a* with one end closed with a clip for processing a subsequent product, as in the situation shown in FIG. 3 and in FIG. 9.

Figure 1:
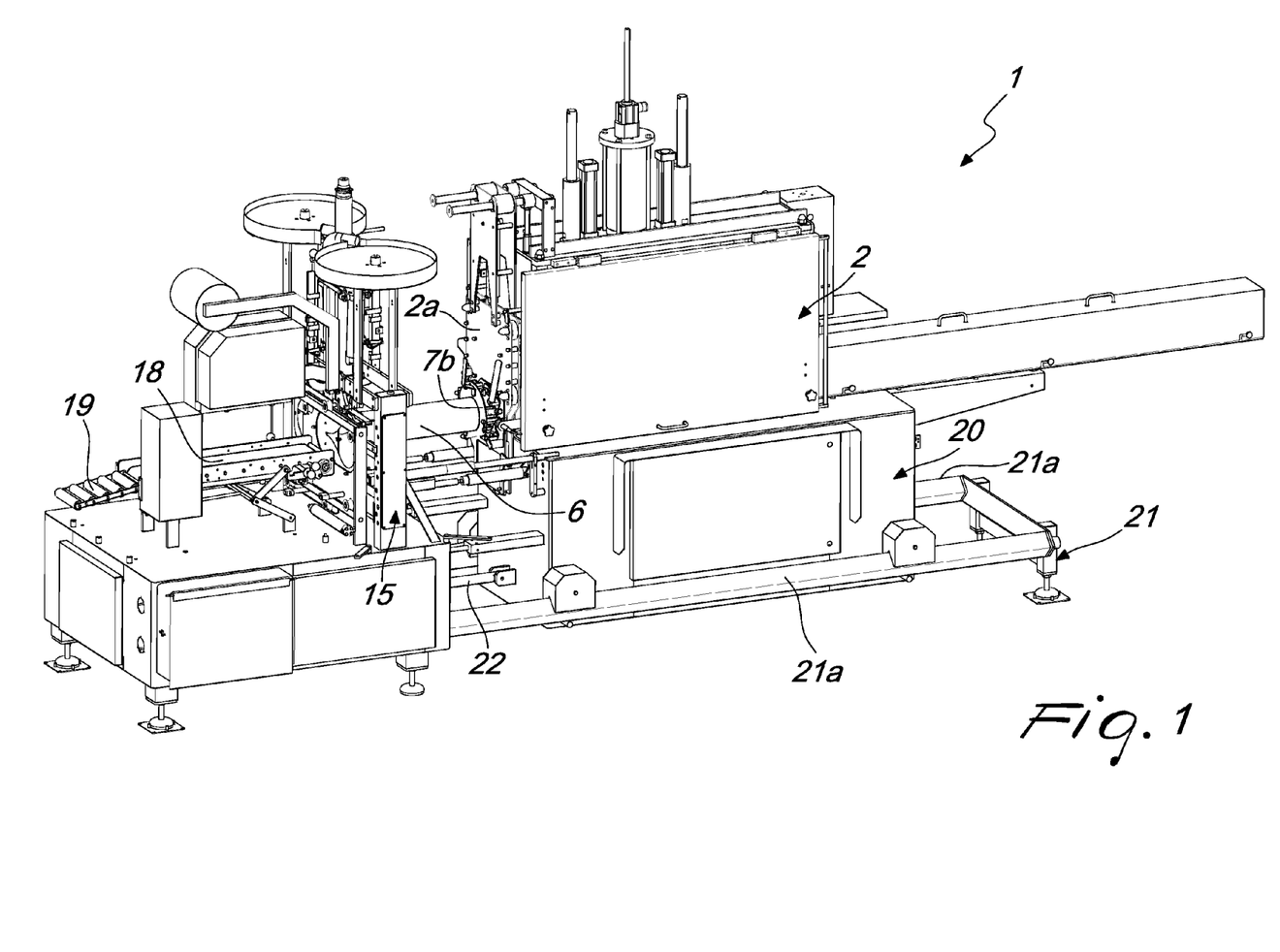
FIG. 1 is a perspective view of the machine according to the invention.
Figure 2:
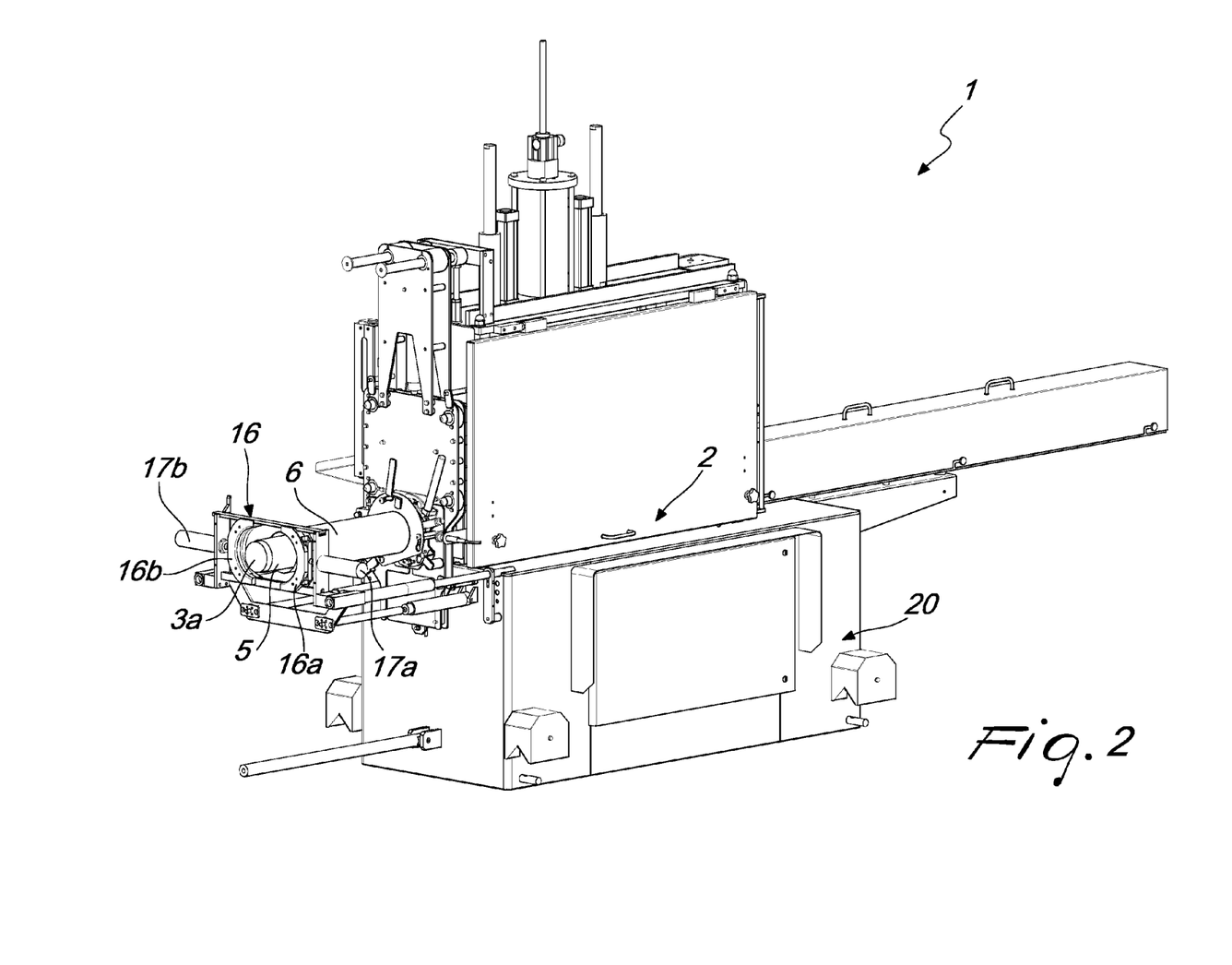
FIG. 2 is a perspective view of a part of the machine according to the invention.

At this point, the pusher 4 is made to reenter the mold 8, the sled 20 is brought to the nearer position to the resting surface 18 and the clipping head 15 is made to retreat to the withdrawn position for rest, so that the machine can be returned to the initial condition shown in FIG. 1.

From the foregoing it can be seen that, at the end of the method according to the invention and of the processing cycle carried out by the machine according to the invention, it is possible to obtain a stuffed food product that is characterized in that it comprises a food product, such as for example a piece of meat, which is inserted into a first casing 5*a*, which is permeable to air, and into a second casing 6*a*, which is impermeable to air and is arranged outside the first casing 5*a*, between the first casing 5*a* and the second casing 6*a* conditions of at least partial vacuum having been achieved, so as to ensure the almost complete evacuation of the air from the food product.

Conveniently, the first casing 5*a* and the second casing 6*a* of such stuffed product are both closed, at the opposite ends of the food product, by way of a single pair of clips, i.e. with a first clip which closes both the first casing 5*a* and the second casing 6*a* at a homologous end thereof and with a second clip which closes both the first casing 5*a* and the second casing 6*a* at their other end.

In practice it has been found that the invention is capable of fully achieving the set aim and objects and, in particular, it should be noted that the method and the machine according to the invention are capable of ensuring an effective elimination of the air from the encased food products.

All the characteristics of the invention, indicated above as advantageous, convenient or similar, may also be missing or be substituted by equivalent characteristics.

The individual characteristics set out in reference to general teachings or to specific embodiments may all be present in other embodiments or may substitute characteristics in such embodiments.

The invention, thus conceived, is susceptible of numerous modifications and variations, all of which are within the scope of the appended claims.

In practice the materials employed, provided they are compatible with the specific use, and the dimensions and shapes, may be any according to requirements.

Moreover, all the details may be substituted by other, technically equivalent elements.

The disclosures in Italian Patent Application No. VR2013A000281 from which this application claims priority are incorporated herein by reference.

What is claimed is:

1. A method for stuffing food products in casings, comprising the steps of supporting a first casing on a first supporting tube, and supporting a second casing on a second supporting tube, wherein the first supporting tube is arranged within the second supporting tube, inserting the product to be stuffed in the first casing, which is permeable to air, and in the second casing, which is impermeable to air and is arranged outside said first casing, creating an at least partial vacuum at least between said first casing and said second casing.

2. The method according to claim 1, further comprising the step of creating an at least partial vacuum inside said first casing as well, during the insertion of the food product in said first casing and in said second casing.

3. The method according to claim 1, further comprising, before said insertion step, a step of closing a homologous end of said first casing and of said second casing, toward which the product is inserted, and, after said insertion step, a step of closing the other end of said first casing and of said second casing.

4. A machine for stuffing food products in casings, which comprises a frame that supports a stuffing duct and a pusher that is adapted to convey the food product to be stuffed toward an output end of said stuffing duct, further comprising a first supporting tube for a first casing, which is arranged outside said stuffing duct and is permeable to air, and a second supporting tube for a second casing, which is arranged to cover part of said first casing and is impermeable to air, means being provided for creating an at least partial vacuum at least between said first casing and said second casing.

5. The machine according to claim 4, wherein said first supporting tube and said second supporting tube are extended substantially coaxially to each other and substantially coaxially to said stuffing duct.

6. The machine according to claim 4, wherein said stuffing duct is defined by an additional tube that is extended within said first supporting tube.

7. The machine according to claim 4, wherein said vacuum generation means comprise air extraction means which are connected to an intake that is connected to the inside of said second supporting tube, in order to extract air from the space that is present between said first supporting tube and said second supporting tube.

8. The machine according to claim 7, wherein said vacuum generation means comprise at least one passage port, which is adapted to connect the inside of said second supporting tube to the inside of said first supporting tube, in order to allow the extraction of the air, by said extraction means, also from the interspace that is comprised between said first supporting tube and an additional tube.

9. The machine according to claim 4, wherein said vacuum generation means comprise means for extracting the air that is present inside said stuffing duct.

10. The machine according to claim 4, further comprising means for closing said first casing and said second casing, which are adapted to act in a region that substantially faces the output end of said stuffing duct.

11. The machine according to claim 4, further comprising means for retaining said second casing which are adapted to contrast the sliding motion of said second casing and of said first casing with respect to said first supporting tube.

* * * * *